United States Patent
Yanagase et al.

(10) Patent No.: US 6,630,246 B1
(45) Date of Patent: Oct. 7, 2003

(54) PHOTOCURABLE SHEET, MOLDINGS THEREOF, AND PROCESSES FOR PRODUCING THE SAME

(75) Inventors: Akira Yanagase, Nagoya (JP); Tadayuki Fujiwara, Otake (JP); Yoko Kakuno, Otake (JP); Yukiya Wakisaka, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/623,419

(22) PCT Filed: Oct. 22, 1998

(86) PCT No.: PCT/JP98/04794

§ 371 (c)(1),
(2), (4) Date: Sep. 5, 2000

(87) PCT Pub. No.: WO99/44827

PCT Pub. Date: Sep. 10, 1999

(30) Foreign Application Priority Data

| Apr. 24, 1997 | (JP) | 9-107718 |
| Mar. 4, 1998 | (JP) | 10-52069 |
| Mar. 4, 1998 | (JP) | 10-52084 |

(51) Int. Cl.[7] .............................................. B32B 27/30
(52) U.S. Cl. ........................ 428/520; 428/522; 264/494
(58) Field of Search ................................ 428/520, 522; 264/494

(56) References Cited

FOREIGN PATENT DOCUMENTS

| JP | 62-128816 | 8/1987 |
| JP | 4-201216 | 7/1992 |
| JP | 5-16171 | 1/1993 |
| JP | 5-38797 | 2/1993 |
| JP | 5-84772 | 4/1993 |
| JP | 7-323 | 1/1995 |
| JP | 9-3288 | 1/1997 |
| JP | 9-267357 | 10/1997 |

OTHER PUBLICATIONS

JP–05–016171, Machine Translation from JPO web site (Jan. 1993).*
Derwent Abstract, JP 5–084772, Apr. 6, 1993.
Derwent Abstract, JP 9–267357, Oct. 14, 1997.
Derwent Abstract, JP 62–128816, Jun. 11, 1987.
Derwent Abstract, JP 4–201216, Jul. 22, 1992.
Derwent Abstract, JP 9–003288, Jan. 7, 1997.

* cited by examiner

*Primary Examiner*—D. Lawrence Tarazano
(74) *Attorney, Agent, or Firm*—Oblon, Spivak, McClelland, Maier & Neustadt, P.C.

(57) ABSTRACT

A photocuring sheet wherein a photocuring resin composition (A) comprising an acrylic resin with a photopolymerizable functional group on the side chains (a-1) and a photopolymerization initiator (a-2), is laminated on a transparent base sheet (B), photocuring decorative sheets and photocuring insert molding sheets employing it, and molded articles and a process for their manufacture, in which the sheets are used.

20 Claims, No Drawings

PHOTOCURABLE SHEET, MOLDINGS THEREOF, AND PROCESSES FOR PRODUCING THE SAME

TECHNICAL FIELD

The present invention relates to a non-adhesive photocuring sheet capable of giving molded articles with excellent outer appearance, design properties, mar-proof properties, chemical resistance and weather resistance, and to molded articles and a process for their manufacture. The photocuring sheet is particularly useful as an automobile interior material for instrument panels, console boxes, meter covers, door lock bezels, steering wheels and the like, as an automobile exterior material for weather-strips, bumpers, strut mounts, side molds, door molds, window molds and the like, as a material for front panels and buttons for AV devices and household appliances, and as an exterior furniture material or a building and house interior and exterior material.

BACKGROUND ART

As methods for shaping plastic articles while providing decorated surfaces there have been proposed (1) a method in which a pattern is preformed in the die surface, (2) a method in which a transfer film is fitted on the inside of the die and the pattern of the film is transferred to the outside of the molded article during molding, and (3) a method in which a functionalized or printed sheet is attached to the inside of the die and the sheet is attached to the molded article surface during molding. Methods (2) and (3) include the methods described in Japanese Unexamined Patent Publication No. 60-250925, Japanese Examined Patent Publication No. 59-36841 and Japanese Examined Patent Publication No. 8-2550, whereby a weather-resistant sheet or printed sheet is formed on the inside of the die, and a molding resin is used for injection molding to produce a molded article whose surface is covered with the sheet.

However, because this technique is carried out with transfer of thermoplastic sheets or printing to provide decoration and functionality, the surface hardness of the resulting molded articles is insufficient. For example, a highly weather resistant sheet made of polyvinylidene fluoride (PVDF) or the like may be used to give the molded article weather resistance, but its problem is a lack of sufficient surface hardness. To counter this, pre-crosslinked high-surface-hardness sheets must be used in order to obtain molded articles with high surface hardness. Such sheets, however, cannot be easily employed for molded articles with three-dimensional shapes.

There have also been proposed, in Japanese Examined Patent Publication No. 7-323, for example, photocuring sheets comprising a laminate of a sheet base and a photocuring resin layer formed using a resin composition containing an acrylic resin, a compound with a reactive vinyl group and a photopolymerization initiator.

According to this process, however, since the sheet prior to photocuring contains a low molecular weight compound with a reactive vinyl group, the surface is tacky and the tackiness of the surface alters with time, such that its storage stability in the form of a roll is poor. Specifically, this causes problems in that, unless it is stored at low temperature, adhesion occurs and prevents unwinding, and the resin oozes out from both edges. The tackiness has also resulted in inconvenience during the printing step when the sheet is used as a printing sheet.

Japanese Unexamined Patent Publication No. 2-289611 discloses a resin composition comprising an acrylic resin containing an alicyclic epoxy group, and a cationic photopolymerization initiator; however, when this resin composition is used alone to form a sheet, an acrylic resin with a low glass transition temperature tends to cause clinging of the sheet to the die when it is used as an insert molding sheet. On the other hand, when an acrylic resin with a high glass transition temperature is used, the resulting fragility of the sheet presents the problem of poorer handleability.

DISCLOSURE OF THE INVENTION

It is an object of the present invention to provide a photocuring laminated sheet with excellent workability and storage stability and a lack of tackiness, that may be used in the manufacture of molded articles with satisfactory decorative designs and that gives molded articles with excellent mar-proof properties, weather resistance and chemical resistance.

In order to achieve this object, the invention provides a photocuring sheet wherein a photocuring resin composition (A) comprising an acrylic resin with a photopolymerizable functional group on the side chains (a-1) and a photopolymerization initiator (a-2), is laminated on a transparent base sheet (B), as well as photocuring decorative sheets and photocuring insert molding sheets employing it, molded articles employing these and a process for their manufacture.

BEST MODE FOR CARRYING OUT THE INVENTION

Preferred embodiments of the invention will now be explained.

The photocuring sheet of the invention has a photocuring resin composition (A) comprising an acrylic resin with a photopolymerizable functional group on the side chains (a-1) and a photopolymerization initiator (a-2), laminated on a transparent base sheet (B). The structure with a photopolymerizable functional group on the polymer side chains promotes crosslinking reaction between the polymer side chains, so that it is not necessary to include a low molecular weight compound with a reactive vinyl group. This offers the advantage of giving a sheet with no tackiness and excellent storage stability.

The photopolymerizable functional group may be any one whose polymerization is promoted by light irradiation, and as a preferred group there may be mentioned the alicyclic epoxy group represented by the following structural formula (1).

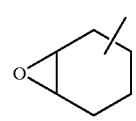

(1)

The compound having an alicyclic epoxy group on the side chain is not particularly restricted so long as it can undergo copolymerization with other (meth)acrylates, and compounds represented by the following structural formula (2) may be specifically mentioned.

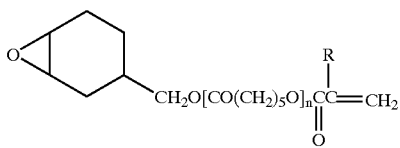

(2)

wherein R represents methyl or hydrogen, and n is an integer of 0–5.

The copolymerization of the compound with a photopolymerizable functional group on the side chain is preferably to 1–100 parts by weight per 100 parts by weight of the acrylic resin (a-1). At less than 1 part by weight, sufficient crosslinking may not occur within the polymer and the desired curing properties may not be achieved. In order to obtain a photocuring sheet with excellent mar-proof properties, the copolymerization of the compound with a photopolymerizable functional group on the side chain is even more preferably to 50–100 parts by weight.

By introducing into the acrylic resin a functional group that participates in crosslinking, it is possible to improve the curing property efficiently with a lower degree of crosslinking.

Known vinyl polymerizable monomers suitable for radical polymerization may also be copolymerized with the acrylic resin (a-1), if necessary. As examples of such vinyl polymerizable monomers there may be mentioned (meth) acrylates such as methyl (meth)acrylate, tricyclodecanyl (meth)acrylate and isobornyl (meth)acrylate; imide derivatives such as N-phenylmaleimide, cyclohexyl maleimide and N-butylmaleimide; hydroxyalkyl group-containing (meth)acrylates such as 2-hydroxyethyl (meth)acrylate and 2-hydroxypropyl (meth)acrylate; amide group-containing vinyl monomers such as acrylamide, methacrylamide and acrylonitrile; epoxy group-containing vinyl monomers such as allyl glycidyl ether and glycidyl (meth)acrylate; and olefinic monomers such as butadiene.

The acrylic resin (a-1) preferably has a glass transition temperature adjusted to 40–150° C. When the glass transition temperature is lower than 40° C., the die release properties of the sheet during insert molding may be inferior. When the glass transition temperature is higher than 150° C., the sheet properties may be rendered fragile, thus impairing the handleability.

Considering the glass transition temperature of the resulting acrylic resin copolymer, it is preferred to use a vinyl polymerizable monomer with a high glass transition temperature of the homopolymer.

The molecular weight of the acrylic resin (a-1) is preferably in the range of 10,000–1,000,000. When the molecular weight is less than 10,000 the sheet may cling to the molding die due to the preheating for insert molding. On the other hand, a molecular weight of greater than 1,000,000 may be an obstacle to synthesis, or may render the acrylic resin less soluble with thorough stirring in organic solvents when the photocuring sheet is manufactured by a solvent casting method, and may result in an impaired outer appearance.

The process for production of the acrylic resin (a-1) is not particularly restricted, and any known radical polymerization process may be applied.

Using the acrylic resin (a-1) can give a photocuring sheet with-satisfactory storage stability in roll form without tackiness on the surface of the photocuring resin composition or without alteration of the tackiness of the surface with the passage of time.

The photopolymerization initiator (a-2) used for the invention may be a radical photopolymerization initiator that produces radicals upon light irradiation or a cationic photopolymerization initiator that produces an acid; a cationic photopolymerization initiator is used when the photopolymerizable functional group on the side chain is an alicyclic epoxy group.

The radical photopolymerization initiator is not particularly restricted so long as it is a known compound, but from the standpoint of yellowing in the curing process and deterioration upon exposure to weather, an initiator containing no amino groups in the molecule, such as an acetophenone-based or benzophenone-based initiator, may preferably be used. Preferred examples include 1-(4-dodecylphenyl)-2-hydroxy-2-methylpropan-1-one, 1-hydroxycyclohexylphenyl ketone, 2-hydroxy-2-methyl-1-phenylpropan-1-one and 1-(4-isopropylphenyl)-2-hydroxy-2-methylpropan-1-one. Care must be taken with some of these initiators since the temperature can temporarily exceed their boiling point depend on the molding process used. For increased surface hardness of the molded article, an oxygen poly merization inhibitor/curing inhibitor such as n-methyldiethanolamine may be added.

In addition to these photopolymerization initiators, various peroxides may also be added for curing by the heat of molding. When a peroxide is added to the photopolymerizable sheet, it must be cured at 150° C. for about 30 seconds, and therefore it is preferred to use a peroxide with a low critical temperature, such as lauroyl peroxide, t-butylperoxy-2-ethyl hexanoate or 1,1-bis(t-butylperoxy)-3,3,5-trimethylcyclohexane.

The amount of the radical photopolymerization initiator is preferably no greater than 5 wt % based on the weight of the compound with the photopolymerizable functional group in the side chain, because its residual amount after curing will affect the weather resistance, and the amount of the amino-based radical photopolymerization initiator, which is associated with yellowing in the curing process, is preferably no greater than 1 wt %.

The cationic photopolymerization initiator is not particularly restricted so long as it is a known compound, and specifically there may be mentioned diallyliodonium salts, triallylsulfonium salts and iron-arene (aromatic hydrocarbon) complexes. Preferred among these, from the standpoint of reactivity with the alicyclic epoxy (meth) acrylate and coloration, are triallylsulfonium salts represented by the following structural formula (3).

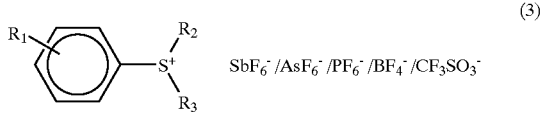

(3)

wherein $R_1$ represents a substituted or unsubstituted aromatic ring via a carbon/carbon bond or a carbon/sulfur bond, and $R_2$ and $R_3$ each represent a substituted or unsubstituted aromatic ring.

Selection of the cationic photopolymerization system offers advantages over a radical photopolymerization system, such as lower hardening shrinkage and more excellent cohesion with the resin, and therefore resistance to cracking and peeling of the cured layer, lower-odor air before and after curing, and no polymerization inhibition by oxygen.

The amount of the cationic photopolymerization initiator (a-2) to be added is preferably 0.1–10 parts by weight per 100 parts by weight of the acrylic resin.

The acrylic rubber elastomer described in Japanese Unexamined Patent Publication No. 9-3288 may be used as the acrylic rubber elastomer (a-3) of which at least the outermost layer is a hard resin layer. For example, it may be a graft copolymer wherein the resin composition includes a rubber layer of which the main constituent unit is an alkyl acrylate ester where the alkyl group has 1–8 carbon atoms, and the outer shell of the rubber layer is covered with a hard resin layer composed mainly of methyl methacrylate. The rubber layer is an elastomer composed mainly of an alkyl acrylate and has a glass transition temperature of no higher than 25° C., and either the same substance may be used for the interior as for the outermost layer, or a hard resin layer with a different composition, composed mainly of methyl methacrylate, may be present.

The hard resin layer has a glass transition temperature of 25° C. or higher, and it is preferably composed of a monomer comprising 40–99.5 wt % of methyl methacrylate, 49.5–0 wt % of an alkyl acrylate wherein the alkyl group has 1–8 carbon atoms, and 0.5–20 wt % of a monofunctional or polyfunctional vinyl monomer or vinylidene monomer that is copolymerized with these monomers.

The alkyl acrylate ester wherein the alkyl group has 1–8 carbon atoms is not particularly restricted, but methyl acrylate, ethyl acrylate, butyl acrylate, 2-ethylhexyl acrylate and the like are preferred. There are also no particular restrictions on the copolymerizable monofunctional or polyfunctional vinyl or vinylidene monomer, but preferred monofunctional monomers include aromatic vinyls such as styrene, cyanated vinyls such as acrylonitrile and maleic acid derivatives such as cyclomaleimide.

Preferred polyfunctional monomers include difunctional monomers such as ethylene dimethacrylate, allyl methacrylate, allyl cinnamate, allyl sorbate and diallyl phthalate; trifunctional monomers such as triallyl cyanurate, triallyl isocyanurate, triallyl trimellitate, trimethylolpropane triacrylate, triallyl fumarate and triallyl maleate; and tetrafunctional monomers such as pentaerythritol tetraacrylate and pyromellitic tetraacrylate, any of which may be used alone or in combination.

To obtain the hard resin layer, a thiol compound such as octylmercaptane may be added as a polymerization chain transfer agent, if necessary, to control the molecular weight.

The acrylic rubber elastomer (a-3) which, may be used is preferably produced by emulsion polymerization. The polymerization temperature will generally be 50–160° C., although this will differ slightly depending on the polymerization method.

The amount of the acrylic rubber elastomer (a-3) to be added is preferably in the range of 0.01–20 parts by weight per 100 parts by weight of the acrylic resin (a-1). When the acrylic, rubber elastomer is added at less than 0.01 part by weight, the effect of the rubber addition may not be achieved, and the film strength may be reduced resulting in a brittle film, if the glass transition temperature of the acrylic; resin (a-1) is above 100° C. When the amount exceeds 20 parts by weight, the film properties after curing may be impaired.

The particle size of the acrylic rubber elastomer (a-3) is preferably 0.1–0.4 μm. When the particle size is smaller than 0.1 μm, the effect of the rubber addition may not be achieved and the film strength may be reduced if the glass transition temperature of the acrylic resin (a-1) is above 100° C., and when the particle size is larger than 0.4 μm the polymerization stability during polymer production may be poor, sometimes to an extent that the polymer to be produced by the invention cannot be obtained, or if it is obtained, the photocuring sheet may exhibit an inferior outer appearance.

A polyfunctional acrylate (a-4) which may be used for the invention must be solid at ordinary temperature. If it is not solid at ordinary temperature, tackiness will be produced in the sheet prior to curing, thus complicating the unwinding of the sheet.

The polyfunctional acrylate (a-4) which is solid at ordinary temperature is preferably one with a large number of double bonds per molecular weight unit, from the standpoint of the curing property. From the standpoint of weather resistance, however, it is preferably an aliphatic one with a small number of double bonds per molecular weight unit. So long as it is solid at ordinary temperature, it may even be an oligomer. In this case, a molecular weight exceeding 5000 may impair the curing property, and therefore the molecular weight of the oligomer is preferably less than 5000. As specific examples of acrylates that are solid at ordinary temperature there may be mentioned polyoxyethyleneglycol dimethacrylate, isocyanuric triacrylate, polyester acrylate, urethane acrylate, epoxy acrylate, and the like.

The polyfunctional acrylate (a-4) which is solid at ordinary temperature is preferably added to an amount in a range of 10–100 parts by weight per 100 parts by weight of the acrylic resin (a-1). When the polyfunctional acrylate which is solid at ordinary temperature is added at less than 10 parts by weight, the crosslinking density of the photocured sheet may approximately be the same as if no polyfunctional acrylate were added, and therefore no effect of addition may be achieved. When it is added at greater than 100 parts by weight, a large amount of the unreacted polyfunctional acrylate may remain in the sheet even after photocuring, resulting in inferior weather resistance.

A photocuring resin composition (A) used for the invention comprises [2] an acrylic resin with a photopolymerizable functional group on the side chains (a-1) and a photopolymerization initiator (a-2), [2] an acrylic resin with a photopolymerizable functional group on the side chains (a-1), a photopolymerization initiator (a-2) and an acrylic rubber elastomer (a-3) of which at least the outermost layer is a hard resin layer, [3] an acrylic resin with a photopolymerizable functional group on the side chains (a-1), a photopolymerization initiator (a-2) and a polyfunctional acrylate (a-4) which is solid at ordinary temperature, or [4] an acrylic resin with a photopolymerizable functional group on the side chains (a-1), a photopolymerization initiator (a-2), an acrylic rubber elastomer (a-3) of which at least the outermost layer is a hard resin layer and a polyfunctional acrylate (a-4) which is solid at ordinary temperature.

The transparent base sheet (B) may be selected as appropriate for the method of use and, for example, there may be mentioned ABS (acrylonitrile-butadiene-styrene copolymer) sheets, vinyl chloride-based resin sheets, polyolefin sheets such as polystyrene and polypropylene sheets, fluorine-based resin sheets, polyester sheets, polycarbonate sheets, soft acrylic sheets and the like. Preferred among these are thermoplastic resin sheets with an elongation of 100% or greater upon heating at 100° C., because of their satisfactory-die-shape-following property in insert molding. From the standpoint of cohesion with the photocuring resin composition (A), weather resistance, transparency, etc., a thermoplastic acrylic resin sheet with a crosslinked rubber component is even more preferred.

Thermoplastic acrylic resin sheets with crosslinked rubber components include thermoplastic acrylic sheets obtained by extrusion molding of an acrylic resin with a multilayered structure such as that disclosed, for example, in Japanese Unexamined Patent Publication No. 9-263614.

The process for production of the photocuring sheet may be a process in which the photocuring resin composition (A) is thoroughly stirred and dissolved in an organic solvent or the like, coated onto the transparent base sheet (B) by a casting method using a knife coater, comma coater, reverse coater or the like, and drying for solvent removal to prepare a laminated sheet. When the resin solution is coated onto a base sheet made of a polyolefin such as polyethylene or polypropylene, it is preferred to [1] precoat the base sheet with a primer comprising a low molecular weight polyolefin or the like, or [2] activate the base sheet surface beforehand by corona discharge or the like (the corona discharge step is preferably carried out a short time before coating since the adherability is highest immediately after activation), in order to increase cohesion between the transparent base sheet and the photocuring resin composition.

The photocuring sheet of the invention may be provided with a printed layer on the transparent base sheet side to make a photocuring decorative sheet.

The following pigments may be used for the ink in the printed layer. As common pigments there may be used yellow pigments including azo-based pigments such as polyazo pigments, organic pigments such as isoindolinone, and inorganic pigments such as chrome yellow; red pigments including azo-based pigments such as polyazo pigments, organic pigments such as quinacridone, and inorganic pigments such as red iron oxide; blue pigments including organic pigments such as phthalocyanine blue and inorganic pigments such as cobalt blue; black pigments including organic pigments such as aniline black; and white pigments including inorganic pigments such as titanium dioxide.

The ink printing method used may be a known gravure rotary printing method or a screen printing method.

A photocuring resin composition according to the invention that employs no low molecular reactive vinyl compound and has crosslinking between the polymers exhibits no tackiness on the surface, results in few troubles during printing and gives satisfactory yields.

A photocuring sheet according to the invention may be fabricated as a photocuring insert molding sheet by forming in order a printed layer, an adhesive layer and if necessary a primer sheet on the transparent base sheet. In this case, the photocuring insert molding sheet preferably has a thickness in the range of 30–750 μm. When the sheet thickness is less than 30 μm, the sheet thickness on curved surface sections may be considerably reduced during deep draw molding, possibly resulting in inferior mar-proofness and poor chemical resistance properties in the obtained molded article. When the sheet thickness exceeds 750 μm, the die shape-following property may be poor.

The adhesive layer may be selected from among any desired synthetic resin materials so long as they have the property of increasing cohesion between the printed layer and the molding resin or between the printed layer and the primer sheet. For example, when the molding resin is a polyolefin, the adhesive layer preferably contains a chlorinated polyolefin.

The primer sheet is formed when necessary, and it is made from a material that is compatible with the molding resin, in order to increase its cohesion with the molding resin. Generally speaking, it is preferably made from the same polymer material as the molding resin. A primer sheet also offers the advantage of minimizing transfer of surface defects of the injection molded article onto the photocuring resin composition. In such a case, the primer sheet must have a thickness that can absorb the surface defects of the molding resin while exhibiting the completely smooth upper surface of the photocuring resin composition.

A molded article fabricated using this photocuring insert molding sheet will now be explained.

The sheet is positioned with the photocuring resin composition (A) facing the die, the photocuring insert molding sheet is heated if necessary to allow the sheet to follow the shape of the die, and then the die is closed and the molten molding resin is injected for molding.

Finally, the molded article is taken out of the die and is irradiated with light using an ultraviolet irradiation lamp or the like. The irradiation dose is usually about 500–1000mJ/cm$^2$. The light irradiation hardens the photocuring resin composition, and can give insert molded articles with hard coatings formed on the surface.

When a molded article decorated with a photocuring insert molded sheet of the invention is to be used primarily outdoors, an ultraviolet absorber or light stabilizer may be added to the sheet. As ultraviolet absorbers there may be used organic substances such as benzotriazole, benzophenone and salicylic acid esters, or inorganic substances such as zinc oxide, cerium oxide and titanium oxide in fine particle form with a size of no greater than 0.2 μm. As light stabilizers there may be used radical scavengers including hindered amine-based radical scavengers and piperidine-based radical scavengers, such as bis-(2,2,6,6-tetramethyl-4-piperidinyl) sebacate.

The molded article obtained in this manner is decorated with color and a design during the molding, and a short period of light irradiation can improve the mar-proof property, chemical resistance and weather resistance. According to the invention, therefore, it is possible to shorten the process, achieve improved yields and reduce effects on the environment, compared to the current means of spray painting after molding.

The photocuring sheet of the invention can also be used as a laminate on an injection molded article, by lamination on an already injection molded resin either directly or via an adhesive layer.

The present invention will now be explained in greater detail by way of examples. Throughout the examples, "parts" will refer to "parts by weight".

Synthesis Example 1
(Synthesis of Acrylic Resin A)

The following components were prepared.

| | |
|---|---|
| (Polymerizable monomer) Cyclomer M100 | 100 g |
| (Solvent) Methyl ethyl ketone | 150 g |
| (Polymerization initiator) Azobisisobutyronitrile | 1 g |

In a 1 L 4-necked flask equipped with a nitrogen inlet tube, stirrer, condenser and thermometer there were placed 100 g of Cyclomer M100 (Daicel Chemical Industries, Ltd.), 60 g of methyl ethyl ketone and 0.3 g of azobisisobutyronitrile under a nitrogen atmosphere, the temperature of the bath was raised to 80° C. while stirring, and polymerization was conducted for 2 hours at that temperature. After then adding the remaining azobisisobutyronitrile in 5 portions every other hour, the internal flask temperature was raised to the boiling point of the solvent and polymerization was continued for 2. hours at that temperature. When the internal flask temperature returned to below 50° C., the remaining methyl ethyl ketone was added, and the polymerization reaction product was removed from the flask to obtain a solution of acrylic resin A. The polymerization rate of the monomer mixture for acrylic resin A was 99.5% or higher, the solid portion was about 40 wt %, the weight average molecular weight was about 220,000 and the glass transition temperature was approximately 73° C.

The Cyclomer M100 used above is an alicyclic epoxy methacrylate represented by the following structural formula (4).

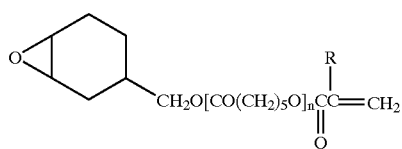

(4)

wherein R represents methyl, and n is 0.

Synthesis Examples 2–7
(Synthesis of Acrylic Resins B–G)

The components listed in Table 1 were prepared, and polymerization was conducted in the same manner as above. The properties of the resulting acrylic resins B–G are summarized in Table 1.

TABLE 1

| Polymerizable monomer | Resin A | Resin B | Resin C | Resin D | Resin E | Resin F | Resin G |
|---|---|---|---|---|---|---|---|
| Methyl methacrylate | | 30 | 70 | | | | 30 |
| n-Butyl methacrylate | | | | 30 | | | |
| Tricyclodecanyl methacrylate | | | | | 30 | | |
| Isobornyl methacrylate | | | | | | 30 | |
| Cyclomer M100 | 100 | 70 | 30 | 70 | 70 | 70 | |
| Cyclomer A200 | | | | | | | 70 |
| Weight average molecular weight | 220K | 210K | 180K | 210K | 220K | 210K | 240K |
| Calculated glass transition temperature (° C.) | 73 | 82 | 95 | 55 | 98 | 94 | 41 |

The Cyclomer A200 used above is an alicyclic epoxy acrylate by Daicel Chemical Industries, Ltd., and it is a compound where R in structural formula (4) is a hydrogen atom and n is 0.

Synthesis Example 8
(Synthesis of Rubber Elastomer A)

(1) Synthesis of innermost layer (I-1)

(Polymerizable monomers)

| | |
|---|---|
| Methyl methacrylate | 182 g |
| Butyl acrylate | 10 g |
| 1,3-butyleneglycol dimethacrylate | 8 g |
| (Initiator) | 0.6 g |
| t-Butyl hydroperoxide | |

In a stirrer-equipped autoclave with a 5 L internal volume there were charged together 2.5 Kg of deionized water, 10 g of boric acid, 1 g of sodium carbonate, 0.001 g of ferrous sulfate, 0.004 g of disodium ethylenediamine tetraacetate and 5 g of an emulsifier (N-lauroylsarcosine sodium, same hereunder), with 80 g of the aforementioned polymerizable monomer mixture and the initiator and, after blowing in nitrogen gas to create a substantially oxygen-free condition, the components were heated to 80° C. and a 10 wt % aqueous solution of sodium formaldehyde sulfoxylate (hereunder, SFS) was added for 60 minutes of polymerization. The remaining 120 g of the polymerizable monomer was then continuously added over a period of 30 minutes, and after completion of the addition, polymerization was continued for another 90 minutes.

(2) Synthesis of rubber layer (I-2)

(Polymerizable monomers)

| | |
|---|---|
| Butyl acrylate | 648 g |
| Styrene | 140 g |
| Triallyl isocyanurate | 8.8 g |
| 1,3-butyleneglycol dimethacrylate | 3.2 g |
| (Initiator) | 3.2 g |
| t-Butyl hydroperoxide | |

To an autoclave-containing 200 g of the product of the first stage (A-1) obtained in (1) above there was added a solution of 2 g of SFS and 5 g of an emulsifier in 50 g of deionized water, polymerization was conducted while continuously adding 800 g of the polymerizable monomer mixture and the initiator over a period of 150 minutes, and upon completion of the addition the polymerization was continued for another 180 minutes.

(3) Synthesis of hard resin layer (I-3)

(Polymerizable monomers)

| | |
|---|---|
| Methyl methacrylate | 475 g |
| Methyl acrylate | 25 g |
| (Initiator) | 0.9 g |
| t-Butyl hydroperoxide | |

After then adding 50 g of a 10 wt % aqueous emulsifier solution to the same container housing a polymer latex containing 1 Kg of (A-1) and (A-2) obtained in (2) above, the internal temperature was kept at 80° C., a mixture of the polymerizable monomer mixture, the initiator and 2.4 g of n-octylmercaptane was added continuously over a period of 90 minutes for polymerization, and after the addition was complete the polymerization was continued for an additional 60 minutes.

The series of polymerization process steps described above produced a polymer latex containing an acrylic rubber elastomer (A). The polymer latex was allowed to coagulate in 1% sulfuric acid water at 70° C. and after washing with deionized water it was dehydrated and dried under an air stream at 80° C. to obtain an acrylic rubber elastomer A in powder form.

Synthesis Example 9
(Synthesis of acrylic resin H)
The following components were prepared.

| | |
|---|---|
| (Polymerizable monomer) Cyclomer M100 | 100 g |
| (Acrylic rubber elastomer) Acrylic rubber elastomer A | 1 g |
| (Solvent) Methyl ethyl ketone | 150 g |
| (Polymerization initiator) Azobisisobutyronitrile | 1 g |

In a 1 L 4-necked flask equipped with a nitrogen inlet tube, stirrer, condenser and thermometer there were placed 60 g of methyl ethyl ketone and the acrylic rubber elastomer A under a nitrogen atmosphere, the temperature of the bath was raised to 800° C. while stirring, and then Cyclomer M100 (Daicel Chemical Industries, Ltd.) and 0.3 g of azobisisobutyronitrile were added dropwise over a period of 2 hours at that temperature. After then adding the remaining azobisisobutyronitrile in 5 portions every other hour, the internal flask temperature was raised to the boiling point of the solvent and polymerization was continued for 2 hours at that temperature. When the internal flask temperature returned to below 5° C., the remaining methyl ethyl ketone was added, and the polymerization reaction product was removed from the flask to obtain a solution of acrylic resin H. The polymerization rate of the monomer mixture for acrylic resin H was 99.5% or higher, the solid portion was about 40 wt %, the weight average molecular weight was about 220,000 and the glass transition temperature was approximately 73° C.

Synthesis Examples 10–15
(Synthesis of Acrylic Resins I–N)

The components listed in Table 2 were prepared, and polymerization was conducted in the same manner as described above. The properties of the resulting acrylic resins I–N are summarized in Table 2.

TABLE 2

| Polymerizable monomer | Resin H | Resin I | Resin J | Resin K | Resin L | Resin M | Resin N |
|---|---|---|---|---|---|---|---|
| Methyl methacrylate | | | 30 | 70 | | | |
| n-Butyl methacrylate | | | | | | 30 | |
| Cyclomer M100 | 100 | 100 | 70 | 30 | 70 | 70 | 100 |
| Acrylic rubber elastomer A | 1 | 10 | 1 | 1 | 1 | 1 | |
| Weight average molecular weight | 220K | 220K | 210K | 180K | 210K | 220K | 220K |
| Calculated glass transition temperature (° C.) | 73 | 73 | 82 | 95 | 55 | 98 | 73 |

EXAMPLES 1–8

Comparative Examples 1–3

The synthesized acrylic-resins A–G and the compounds listed in Table 3 were used to prepare photocuring resin solutions having the compositions shown in Table 3.

The amounts for each of the components in Table 3 are given in terms of parts by weight based on the solid portion.

TABLE 3

| | Examples | | | | | | | | Comp. Exs. | | |
|---|---|---|---|---|---|---|---|---|---|---|---|
| Components | 1 | 2 | 3 | 4 | 5 | 6 | 7 | 8 | 1 | 2 | 3 |
| Acrylic resin A | 100 | 100 | | | | | | | | | |
| Acrylic resin B | | | 100 | | | | | | | | |
| Acrylic resin C | | | | 100 | | | | | | | |
| Acrylic resin D | | | | | 100 | | | | | | |
| Acrylic resin E | | | | | | 100 | | | | | |
| Acrylic resin F | | | | | | | 100 | | | | |
| Acrylic resin G | | | | | | | | 100 | | | |
| Acrylic resin O 1) | | | | | | | | | 100 | | |
| Acrylic resin P 2) | | | | | | | | | | 100 | 100 |
| Monomer 3) | | | | | | | | | 100 | 30 | |
| Initiator A 4) | 1 | 10 | 1 | 1 | 1 | 1 | 1 | 1 | | | |
| Initiator B 5) | | | | | | | | | | 0.6 | 0.2 |
| Solvent 6) | | | | | | | | | | 300 | 300 |

Notes:
1) Polyisobutyl methacrylate, weight average molecular weight = 55,000, Tg = 50° C.
2) Methyl methacrylate/methyl acrylate = 95/5 (weight ratio), weight average molecular weight = 65,000, Tg = 98° C.
3) Reactive vinyl group-containing compound: trimethylolpropane triacrylate.
4) Cationic photopolymerization initiator: SUN-AID SI-100L (product of Sanshin Chemical Co.).

TABLE 3-continued

|  | Examples | | | | | | | | Comp. Exs. | | |
|---|---|---|---|---|---|---|---|---|---|---|---|
| Components | 1 | 2 | 3 | 4 | 5 | 6 | 7 | 8 | 1 | 2 | 3 |

5) Photopolymerization initiator: Irgacure 184 (Ciba-Geigy), 1-hydroxycyclohexyl phenyl ketone.
6) Ethyl acetate Each obtained composition solution was stirred in a propeller mixer and coated to a coating width of 350 mm onto a 200 μm-thick transparent soft acrylic sheet including a crosslinked rubber component as the sheet base, and then a hot air drier was used for drying to form a photocuring resin layer with a thickness of 20 μm. This was then wound up into a roll around an ABS core with a 20 m length and 300 mm-wide slits. When the breaking elongation of the transparent soft acrylic sheet alone was measured with a Tensilon, the breaking elongation under heating at 100° C. was found to be 400%.

After storage as a roll at room temperature for about 2 weeks, the tackiness of the surface while unwinding was evaluated. The breaking elongation of the unwindable films before curing was measured with a Tensilon at room temperature. The results are shown in Table 4. The tackiness evaluation was based on the following scale.

○: no tackiness, Δ: tackiness, X: considerable tackiness, not unwindable.

Inks comprising black, brown and yellow pigments were then used for printing of a pattern on the transparent soft acrylate sheet side by a gravure printing method, to obtain a photocuring insert molding sheet. The sheet thickness was 223 μm.

The photocuring insert molding sheet was positioned with the photocuring resin composition facing the die, and the sheet was then preheated for 15 seconds with an infrared heater temperature of 300° C., after which heating was continued with suction to cause the sheet to follow the shape of the die.

Insert molding was carried out under conditions with a molding temperature of 220–250° C. and a die temperature of 40–60° C., using an acrylonitrile-butadiene-polystyrene copolymer resin as the molding resin, to obtain an insert molded article with a photocuring insert molding sheet adhered to the molded article.

An ultraviolet irradiation apparatus was then used for irradiation with ultraviolet rays at about 700 mJ/cm² to harden the photocuring resin composition, and the surface properties thereof were evaluated. The results are shown in Table 4.

The sheet property evaluation was conducted as follows.
[1] Gasoline Resistance

The condition after contact for one hour with commercial high-octane gasoline at room temperature was evaluated visually.

○: no change
Δ: slight discoloration
X: considerable discoloration, sheet cracks

[2] Acid Resistance

The outer appearance was evaluated visually after a 3 hour spot test at 40° C. using a 47 wt % aqueous sulfuric acid solution.

○: satisfactory
Δ: slight traces
X: considerable traces

[3] Alkali Resistance

The outer appearance was evaluated visually after a 24 hour spot test (50° C.) using a 5 wt % aqueous sodium hydroxide solution.

○: satisfactory
Δ: slight traces
X: considerable traces

[4] Hot Water Resistance

The condition of the sheet was evaluated visually after immersion in 50° C. hot water for one hour.

○: satisfactory
Δ: slight whitening
X: considerable whitening

[5] Abrasion Resistance

The condition of the sheet was evaluated visually after a Taber abrasion test (conducted using an abrasive wheel with a 250 g load on each side and a rotation rate of 60 rpm, repeating the test 30 times).

⊚: essentially no mars
○: very few mars
Δ: few mars
X: considerable mars

The outer appearance of the molded article was also evaluated visually.

⊚: very satisfactory
○: satisfactory
Δ: somewhat poor
X: poor

TABLE 4

|  | Example | | | | | | | | Comp. Ex. | | |
|---|---|---|---|---|---|---|---|---|---|---|---|
|  | 1 | 2 | 3 | 4 | 5 | 6 | 7 | 8 | 1 | 2 | 3 |
| Uncured sheet | | | | | | | | | | | |
| Tackiness | ○ | ○ | ○ | ○ | ○ | ○ | ○ | ○ | x | Δ | ○ |
| Breaking elongation (%) | 43 | 43 | 42 | 40 | 48 | 40 | 40 | 50 | — | 15 | 10 |
| Insert molded article | | | | | | | | | | | |
| Gasoline resistance | ○ | ○ | ○ | ○ | ○ | ○ | ○ | ○ | — | — | Δ |
| Acid resistance | ○ | ○ | ○ | Δ | ○ | ○ | ○ | ○ | — | — | Δ |

TABLE 4-continued

|  | Example | | | | | | | | Comp. Ex. | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Alkali resistance | ○ | ○ | ○ | Δ | ○ | ○ | ○ | ○ | — | — | Δ |
| Hot water resistance | ○ | ○ | ○ | ○ | ○ | ○ | ○ | Δ | — | — | Δ |
| Abrasion resistance | ⊙ | ⊙ | ○ | Δ | ○ | ○ | ○ | ○ | — | — | x |
| Note |  |  |  |  |  |  |  |  | Not moldable | Not moldable |  |

As shown in Table 4, the comparative examples had is tackiness on the sheet surface, poor storage stability when rolled up, and exhibited printing suitability defects. Although an improved glass transition temperature of the polymer or a lower monomer content ratio tended to result in reduced tackiness, the long-term stability and printing suitability were unstable, and the resulting film had low elongation and was very brittle. In the case of Comparative Example 3 where the sheet had no photopolymerizable functional group, there was a problem of poorer sheet properties of the insert molded article, and particularly reduced abrasion resistance. On the other hand, the examples all gave films with no tackiness, satisfactory storage stability and printing suitability, high elongation and an excellent insert molding property. The properties after curing were also satisfactory.

EXAMPLES 9–16

The synthesized acrylic rubber elastomer A, the acrylic resins H–N and the compounds listed in Table 5 were used to prepare photocuring resin solutions having the compositions shown in Table 5.

The amounts for each of the components in Table 5 are given in terms of parts by weight based on the solid portion.

TABLE 5

|  | Examples | | | | | | | |
| --- | --- | --- | --- | --- | --- | --- | --- | --- |
| Components | 9 | 10 | 11 | 12 | 13 | 14 | 15 | 16 |
| Acrylic resin H | 100 | 100 |  |  |  |  |  |  |
| Acrylic resin I |  |  | 100 |  |  |  |  |  |
| Acrylic resin J |  |  |  | 100 |  |  |  |  |
| Acrylic resin K |  |  |  |  | 100 |  |  |  |
| Acrylic resin L |  |  |  |  |  | 100 |  |  |
| Acrylic resin M |  |  |  |  |  |  | 100 |  |
| Acrylic resin N |  |  |  |  |  |  |  | 100 |
| Acrylic resin P 1) |  |  |  |  |  |  |  |  |
| Monomer 2) |  |  |  |  |  |  |  |  |
| Acrylic rubber elastomer A |  |  |  |  |  |  |  | 1 |
| Initiator A 3) | 1 | 10 | 1 | 1 | 1 | 1 | 1 | 1 |

Notes:
1) Methyl methacrylate/methyl acrylate = 95/5 (weight ratio), weight average molecular weight = 65,000, Tg = 98° C.
2) Reactive vinyl group-containing compound: trimethylolpropane triacrylate.
3) Cationic photopolymerization initiator: SUN-AID SI-100L (product of Sanshin Chemical Co.).

Each obtained composition solution was stirred in a propeller mixer and coated to a coating width of 350 mm onto a 200 μm-thick transparent soft acrylic sheet including a crosslinked rubber component as the sheet base, and then a hot air drier was used for drying to form a photocuring resin, layer with a thickness of 20 μm. This was then wound up into-a roll around an ABS core with a 20 m length and 300 mm-wide slits. When the breaking elongation of the transparent soft acrylic sheet alone was measured with a Tensilon, the breaking elongation under heating at 100° C. was found to be 400%.

After storage as a roll at room temperature for about 2 weeks, the tackiness of the surface while unwinding was evaluated. The breaking elongation of the unwindable films before curing was measured with a Tensilon at room temperature. The results are shown in Table 6.

Inks comprising black, brown and yellow pigments were then used for printing of a pattern on the transparent soft acrylate sheet side by a gravure printing method, to obtain a photocuring insert molding sheet. The sheet thickness was 223 μm.

The photocuring insert molding sheet was positioned with the photocuring resin composition facing the die, and the sheet was then preheated for 15 seconds with an infrared heater temperature of 300° C., after which heating was continued with suction to cause the sheet to follow the shape of the die.

Insert molding was carried out under conditions with a molding temperature of 220–250° C. and a die temperature of 40–60° C., using an acrylonitrile-butadiene-polystyrene copolymer resin as the molding resin, to obtain an insert molded article with a photocuring insert molding sheet adhered to the molded article.

An ultraviolet irradiation apparatus was then used for irradiation with ultraviolet rays at about 700 mJ/cm$^2$ to harden the photocuring resin composition, and the surface properties thereof were evaluated. The results are shown in Table 6.

EXAMPLE 17

The composition solution prepared in Example 9 was stirred in a propeller mixer and coated to a coating width of 350 mm onto a 100 μm-thick transparent polypropylene sheet that had been precoated with a chlorinated polyolefin as the transparent base sheet, and then a hot air drier was used for drying to form a photocuring resin layer with a thickness of 20 μm. This was then wound up into a roll around an ABS core with a 20 m length and 300 mm-wide slits. When the breaking elongation of the transparent polypropylene sheet alone was measured with a Tensilon, the breaking elongation under heating at 100° C. was found to be 400%.

Inks comprising black, brown and yellow pigments were then used for printing of a pattern on the transparent polypropylene sheet side, by a gravure printing method, to obtain a photocuring insert molding sheet. The sheet thickness was 125 μm.

The photocuring insert molding sheet was positioned with the photocuring resin composition facing the die, and the sheet was then preheated for 15seconds with an infrared heater at a temperature of 200° C., after which heating was continued with suction to cause the sheet to follow the shape of the die.

Insert molding was carried out under conditions with a molding temperature of 200° C. and a die temperature of 40–60° C., using a polypropylene resin (MA03, Nihon Polychem) as the molding resin, to obtain an insert molded article with a photocuring insert molding sheet adhered to the molded article. Table 7 shows the results of evaluating the insert molding property of the sheet. The insert molding property was evaluated based on the following scale.

⊚: very satisfactory, ○: satisfactory, Δ: poor handleability, X: unmoldable.

An ultraviolet irradiation apparatus was then used for irradiation with ultraviolet rays at about 700 mJ/cm² to harden the photocuring resin composition.

EXAMPLE 18

An insert molding sheet was obtained, and an insert molded article obtained therefrom by insert molding, in the same manner as Example 9 except that a 50 μm-thick polyethylene terephthalate sheet was used as the transparent base sheet in Example 9. The results of evaluating the insert molding property are shown in Table 7.

An ultraviolet irradiation apparatus was then used for irradiation with ultraviolet rays at about 700 mJ/cm² to harden the photocuring resin composition.

EXAMPLE 19

A photocuring insert molding sheet was obtained, and an insert molded article obtained therefrom by insert molding, in the same manner as Example 9 except that a 50 μm-thick polycarbonate sheet was used as the transparent base sheet in Example 9. The results of evaluating the insert molding property are shown in Table 7.

An ultraviolet irradiation apparatus was then used for irradiation with ultraviolet rays at about 700 mJ/cm² to harden the photocuring resin composition.

TABLE 6

| | Examples | | | | | | | |
|---|---|---|---|---|---|---|---|---|
| | 9 | 10 | 11 | 12 | 13 | 14 | 15 | 16 |
| Uncured sheet | | | | | | | | |
| Tackiness | ○ | ○ | ○ | ○ | ○ | ○ | ○ | ○ |
| Breaking strength (mPa) | 62 | 62 | 59 | 63 | 65 | 60 | 66 | 62 |
| Breaking elongation (%) | 45 | 45 | 48 | 43 | 41 | 62 | 40 | 45 |
| Insert molded article | | | | | | | | |
| Gasoline resistance | ○ | ○ | ○ | ○ | ○ | ○ | ○ | ○ |
| Acid resistance | ○ | ○ | ○ | ○ | Δ | ○ | ○ | ○ |
| Alkali resistance | ○ | ○ | ○ | ○ | Δ | ○ | ○ | ○ |
| Hot water resistance | ○ | ○ | ○ | ○ | ○ | Δ | ○ | ○ |
| Abrasion resistance | ⊚ | ⊚ | ○ | ○ | Δ | ○ | ○ | ⊚ |
| Outer appearance | ⊚ | ⊚ | ⊚ | ⊚ | ⊚ | ⊚ | ⊚ | ○ |

TABLE 7

| | Examples | | | |
|---|---|---|---|---|
| | 9 | 17 | 18 | 19 |
| Insert molding property | ⊚ | ⊚ | ○ | ○ |

As shown in Tables 6 and 7, all of the films were free of tackiness and had satisfactory storage stability and printing suitability, with high elongation and an excellent insert molding property. The properties after curing were also satisfactory.

EXAMPLE 20–28

The synthesized acrylic resins A-E and the compounds listed in Table 8 were used to prepare photocuring resin solutions having the compositions shown in Table 8.

The amounts for each of the components in Table 8 are given in terms of parts by weight based on the solid portion.

TABLE 8

| | Examples | | | | | | | | |
|---|---|---|---|---|---|---|---|---|---|
| Components | 20 | 21 | 22 | 23 | 24 | 25 | 26 | 27 | 28 |
| Acrylic resin A | 100 | 100 | 100 | 100 | | | | | |
| Acrylic resin B | | | | | 100 | | | | |
| Acrylic resin C | | | | | | 100 | | | |
| Acrylic resin D | | | | | | | 100 | | |
| Acrylic resin E | | | | | | | | 100 | |
| Acrylic resin G | | | | | | | | | 100 |
| Acrylic resin P 1) | | | | | | | | | |
| Polyfunctional acrylate 2) | 30 | 30 | 80 | | 30 | 30 | 30 | 30 | 30 |
| Polyfunctional acrylate 3) | | | | 30 | | | | | |
| Polyfunctional acrylate 4) | | | | | | | | | |
| Initiator A 5) | 1 | 10 | 1 | 1 | 1 | 1 | 1 | 1 | 1 |
| Initiator B 6) | 0.3 | 0.3 | 0.8 | 0.3 | 0.3 | 0.3 | 0.3 | 0.3 | 0.3 |

Notes:
1) Methyl methacrylate/methyl acrylate = 95/5 (weight ratio), weight average molecular weight = 65,000, Tg = 98° C.
2) Polyfunctional acrylate (A): FANCRYL FA-731A (Hitachi Kasei, KK.), isocyanuric triacrylate, mp = approx. 53° C.
3) Polyfunctional acrylate (B): RIPOXY VR-60 (Showa Highpolymer, KK.), bisphenol A diacrylate, mp = 70–80° C.
4) Polyfunctional acrylate (C): Kayarad D-310 (Nippon Kayaku, KK.), pentafunctional acrylate, liquid at ordinary temperature.
5) Cationic photopolymerization initiator: SUN-AID SI-100L (product of Sanshin Chemical Co.).

TABLE 8-continued

|  | Examples | | | | | | | | |
|---|---|---|---|---|---|---|---|---|---|
| Components | 20 | 21 | 22 | 23 | 24 | 25 | 26 | 27 | 28 |

6) Photopolymerization initiator: Irgacure 184 (Ciba-Geigy), 1-hydroxycyclohexyl phenyl ketone.

Each obtained composition solution was stirred in a propeller mixer and coated to a coating width of 350 mm onto a 200 μm-thick transparent soft acrylic sheet including a crosslinked rubber component as the sheet base, and then a hot air drier was used for drying to form a photocuring resin layer with a thickness of 20 μm. This was then wound up into a roll around an ABS core with a 20 m length and 300 mm-wide slits. When the breaking elongation of the transparent soft acrylic sheet alone was measured with a Tensilon, the breaking elongation under heating at 100° C. was found to be 400%.

After storage as a roll at room temperature for about 2 weeks, the tackiness of the surface while unwinding was evaluated. The breaking elongation of the unwindable films before curing was measured with a Tensilon at room temperature. The results are shown in Table 9.

Inks comprising black, brown and yellow pigments were then used for printing of a pattern on the transparent soft acrylate sheet side by a gravure printing method, to obtain a photocuring insert molding sheet. The sheet thickness was 223 μm.

The photocuring insert molding sheet was positioned with the photocuring resin composition facing the die, and the sheet was then preheated for 15 seconds at an infrared heater temperature of 300° C., after which heating was continued with suction to cause the sheet to follow the shape of the die.

Insert molding was carried out under conditions with a molding temperature of 220–250° C. and a die temperature of 40–60° C., using an acrylonitrile-butadiene-polystyrene copolymer resin as the molding resin, to obtain an insert molded article with a photocuring insert molding sheet adhered to the molded article.

An ultraviolet irradiation apparatus was then used for irradiation with ultraviolet rays at about 700 mJ/cm² to harden the photocuring resin composition, and the surface properties thereof were evaluated. The results are shown in Table 9.

EXAMPLE 29

The composition solution prepared in Example 20 was stirred in a propeller mixer and coated to a coating width of 350 mm onto a 100 μm-thick transparent polypropylene sheet that had been precoated with a chlorinated polyolefin as the transparent base sheet, and then a hot air drier was used for drying to form a photocuring resin layer with a thickness of 20 μm. This was then wound up into a roll around an ABS core with a 20 m length and 300 mm-wide slits. When the breaking elongation of the transparent polypropylene sheet alone was measured with a Tensilon, the breaking elongation under heating at 100° C. was found to be 400%.

Inks comprising black, brown and yellow pigments were then used for printing a pattern on the transparent polypropylene sheet side by a gravure printing method, to obtain a photocuring insert molding sheet. The sheet thickness was 125 μm.

The photocuring insert molding sheet was positioned with the photocuring resin composition facing the die, and the sheet was then preheated for 15 seconds with an infrared heater at a temperature of 200° C., after which heating was continued with suction to cause the sheet to follow the shape of the die.

Insert molding was carried out under conditions with a molding temperature of 200° C. and a die temperature of 40–60° C., using a polypropylene resin (MA03, Nihon Polychem) as the molding resin, to obtain an insert molded article with a photocuring insert molding sheet adhered to the molded article. Table 10 shows the results of evaluating the insert molding property of the sheet.

An ultraviolet irradiation apparatus was then used for irradiation with ultraviolet rays at about 700 mJ/cm² to harden the photocuring resin composition.

EXAMPLE 30

A photocuring insert molding sheet was obtained, and an insert molded article obtained therefrom by insert molding, in the same manner as Example 20 except that a 50 μm-thick polyethylene terephthalate sheet was used as the transparent base sheet in Example 20. The results of evaluating the insert molding property are shown in Table 10.

An ultraviolet irradiation apparatus was then used for irradiation with ultraviolet rays at about 700 mJ/cm² to harden the photocuring resin composition.

EXAMPLE 31

A photocuring insert molding sheet was obtained, and an insert molded article obtained therefrom by insert molding, in the same manner as Example 20 except that a 50 μm-thick polycarbonate sheet was used as the transparent base sheet in Example 20. The results of evaluating the insert molding property are shown in Table 10.

An ultraviolet irradiation apparatus was then used for irradiation with ultraviolet rays at about 700 mJ/cm² to harden the photocuring resin composition.

TABLE 9

|  | Examples | | | | | | | | |
|---|---|---|---|---|---|---|---|---|---|
|  | 20 | 21 | 22 | 23 | 24 | 25 | 26 | 27 | 28 |
| Uncured sheet | | | | | | | | | |
| Tackiness 1) | ○ | ○ | ○ | ○ | ○ | ○ | ○ | ○ | ○ |
| Breaking elongation (%) | 44 | 44 | 47 | 44 | 43 | 42 | 58 | 43 | 59 |
| Insert molded article | | | | | | | | | |
| Gasoline resistance | ○ | ○ | ○ | ○ | ○ | ○ | ○ | ○ | ○ |
| Acid resistance | ○ | ○ | ○ | ○ | ○ | Δ | ○ | ○ | ○ |
| Alkali resistance | ○ | ○ | ○ | ○ | ○ | Δ | ○ | ○ | ○ |
| Hot water resistance | ○ | ○ | ○ | ○ | ○ | ○ | Δ | ○ | Δ |
| Abrasion resistance | ⊚ | ⊚ | ⊚ | ⊚ | ○ | Δ | ○ | ○ | ○ |

TABLE 10

|  | Examples | | | |
| --- | --- | --- | --- | --- |
|  | 20 | 29 | 30 | 31 |
| Insert moldability | ◉ | ◉ | ○ | ○ |

As shown in Tables 9 and 10, all of the films were free of tackiness and had satisfactory storage stability and printing suitability, with high elongation and an excellent insert molding property. The properties after curing were also satisfactory.

Industrial Applicability

According to the present invention it is possible to easily obtain photocuring printed sheets on which colors or designs may be printed, which may be used for simultaneous molding by injection molding to form general purpose resin molded articles with surfaces having colors or designs and a satisfactory appearance, as well as mar-proof properties and good chemical resistance. Consequently, the photocuring sheets of the invention are useful as automobile interior materials for instrument panels, console boxes, meter covers, door lock bezels, steering wheels and the like, as automobile exterior materials for weather-strips, bumpers, strut mounts, side molds, door molds, window molds and the like, as materials for front panels and buttons for AV devices and household appliances, and as exterior furniture materials or building and house interior and exterior materials. The photocuring sheets of the invention can also be manufactured by a shorter process than painting of molded article surfaces, and with the increased productivity there is also less effect on the environment.

What is claimed is:

1. A photocuring sheet wherein a photocuring resin composition (A) comprising an acrylic resin with a photopolymerizable functional group on the side chains (a-1), a photopolymerization initiator (a-2) and a polyfunctional acrylate (a-4) which is solid at ordinary temperature, is laminated on a transparent base sheet (B).

2. A photocuring sheet according to claim 1, wherein the photocuring resin composition (A) further comprises an acrylic rubber elastomer (a-3) of which at least the outermost layer is a hard resin layer.

3. A photocuring decorative sheet wherein a printed layer is provided on the transparent base sheet side of a photocuring sheet according to claim 1.

4. A photocuring insert molding sheet wherein an adhesive layer and if necessary a primer sheet are formed in that order on the printed layer side of a photocuring decorative sheet according to claim 3.

5. A process for the manufacture of an insert molded article, which comprises positioning a photocuring sheet according to claim 1 with the photocuring resin composition side facing the die, heating the photocuring sheet if necessary to allow the sheet to follow the shape of the die, subsequently injecting a molten resin into the die and hardening the resin to form the photocuring sheet on the resin surface, and finally subjecting it to light irradiation for photocuring of the photocuring resin composition.

6. A process for the manufacture of an insert molded article, which comprises positioning a photocuring decorative sheet according to claim 3 with the photocuring resin composition side facing the die, heating the photocuring sheet if necessary to allow the sheet to follow the shape of the die, subsequently injecting a molten resin into the die and hardening the resin to form the photocuring sheet on the resin surface, and finally subjecting it to light irradiation for photocuring of the photocuring resin composition.

7. A process for the manufacture of an insert molded article, which comprises positioning a photocuring insert molding sheet according to claim 4 with the photocuring resin composition side facing the die, heating the photocuring sheet if necessary to allow the sheet to follow the shape of the die, subsequently injecting a molten resin into the die and hardening the resin to form the photocuring sheet on the resin surface, and finally subjecting it to light irradiation for photocuring of the photocuring resin composition.

8. An insert molded article, fabricated by positioning a photocuring sheet according to claim 1 with the photocuring resin composition side facing the die, heating the photocuring sheet if necessary to allow the sheet to follow the shape of the die, subsequently injecting a molten resin into the die and hardening the resin to form the photocuring sheet on the resin surface, and finally subjecting it to light irradiation for photocuring of the photocuring resin composition.

9. An insert molded article, fabricated by positioning a photocuring decorative sheet according to claim 3 with the photocuring resin composition side facing the die, heating the photocuring sheet if necessary to allow the sheet to follow the shape of the die, subsequently injecting a molten resin into the die and hardening the resin to form the photocuring sheet on the resin surface, and finally subjecting it to light irradiation for photocuring of the photocuring resin composition.

10. An insert molded article, fabricated by positioning a photocuring insert molding sheet according to claim 4 with the photocuring resin composition side facing the die, heating the photocuring sheet if necessary to allow the sheet to follow the shape of the die, subsequently injecting a molten resin into the die and hardening the resin to form the photocuring sheet on the resin surface, and finally subjecting it to light irradiation for photocuring of the photocuring resin composition.

11. The photocuring sheet according to claim 1, wherein said polyfunctional acrylate (a-4) has a molecular weight of not more than 5000.

12. The photocuring sheet according to claim 1, wherein said polyfunctional acrylate (a-4) is selected from the group consisting of a polyoxyethyleneglycol dimethacrylate, an isocyanuric triacrylate, a polyester acrylate, a urethane acrylate, and an epoxy acrylate.

13. The photocuring sheet according to claim 1, wherein said polyfunctional acrylate (a-4) is at a concentration of 10 to 100 parts by weight per 100 parts by weight of the acrylic resin (a-1).

14. The photocuring sheet according to claim 1, wherein said photopolymerizable functional group is an alicyclic epoxy group.

15. The photocuring sheet according to claim 14, wherein a compound having the photopolymerizable functional group is in an amount of 1 to 100 parts by weight per 100 parts by weight of the acrylic resin (a-1) after copolymerization.

16. The photocuring sheet according to claim 1, wherein the acrylic resin (a-1) has a glass transition temperature of 40 to 150° C.

17. The photocuring sheet according to claim 1, wherein the acrylic resin (a-1) has a molecular weight of 10,000 to 1,000,000.

18. The photocuring sheet according to claim 1, wherein the photopolymerization initiator (a-2) is a radical photopolymerization initiator or a cationic photopolymerization initiator.

19. The photocuring sheet according to claim 1, further comprising a peroxide.

20. The photocuring sheet according to claim 2, wherein said acrylic rubber elastomer (a-3) is at a concentration of 0.01 to 20 parts by weight per 100 parts by weight of the acrylic resin (a-1).

* * * * *